(12) United States Patent
Pan

(10) Patent No.: US 10,602,046 B2
(45) Date of Patent: Mar. 24, 2020

(54) MOBILE DEVICE AND CONTROL METHOD

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 18 days.

(21) Appl. No.: 15/980,731

(22) Filed: May 15, 2018

(65) Prior Publication Data

US 2019/0020809 A1    Jan. 17, 2019

Related U.S. Application Data

(60) Provisional application No. 62/530,862, filed on Jul. 11, 2017.

(51) Int. Cl.
| | |
|---|---|
| *H04N 5/232* | (2006.01) |
| *H04W 4/80* | (2018.01) |
| *G06K 9/00* | (2006.01) |
| *H04L 29/12* | (2006.01) |

(Continued)

(52) U.S. Cl.
CPC ......... *H04N 5/23206* (2013.01); *G06F 3/011* (2013.01); *G06K 9/00355* (2013.01); *G06K 9/00671* (2013.01); *H04L 12/282* (2013.01); *H04L 61/1541* (2013.01);

(Continued)

(58) Field of Classification Search
CPC ............ G06K 9/00671; G08C 2201/20; H04B 1/202; H04L 12/282; H04L 2012/2841; H04L 2012/2849; H04L 67/36; H04M 1/7253; H04M 2250/52; H04M 2207/18; H04N 2005/4408; H04N 2005/4425; H04N 21/42207; H04N 21/4222; H04N 21/42222; H04N 21/43615; H04N 21/43637; H04N 5/4403; H04W 76/14; H04W 8/005; H04W 76/16; G06T 19/006; G06F 3/0482

See application file for complete search history.

(56) References Cited

U.S. PATENT DOCUMENTS

| | | | |
|---|---|---|---|
| 8,639,214 B1 * | 1/2014 | Fujisaki | G06Q 20/32 |
| | | | 379/88.03 |
| 9,014,685 B2 * | 4/2015 | Bathiche | H04L 12/282 |
| | | | 455/420 |
| 9,237,413 B2 * | 1/2016 | Hirose | H04L 43/0811 |

(Continued)

OTHER PUBLICATIONS

The extended search report of the corresponding European application dated Oct. 11, 2018.

*Primary Examiner* — Chiawei Chen
(74) *Attorney, Agent, or Firm* — CKC & Partners Co., LLC

(57) ABSTRACT

A control method suitable for a mobile device comprising a camera includes operations as follows: obtaining a description of a first wireless device adjacent to the mobile device over a first wireless communication; capturing a first image of a physical environment by the camera; recognizing a first candidate object within the first image; matching the first candidate object with the description of the first wireless device; and in response to that the first candidate object matches with the description of the first wireless device and a first predetermined instruction is received by the camera, generating a first command according to the description of the first wireless device, wherein the first command is to be transmitted to the first wireless device over a second wireless communication for manipulating the first wireless device.

22 Claims, 9 Drawing Sheets

(51) Int. Cl.
  *G06F 3/01*   (2006.01)
  *H04L 12/28*  (2006.01)
(52) U.S. Cl.
  CPC ........... *H04W 4/80* (2018.02); *H04L 61/6022* (2013.01); *H04L 2012/2841* (2013.01)

(56) References Cited

U.S. PATENT DOCUMENTS

| | | | |
|---|---|---|---|
| 9,380,621 B2* | 6/2016 | Jamal-Syed | H04M 1/7253 |
| 9,940,011 B2* | 4/2018 | Kim | G06F 3/0482 |
| 2004/0160519 A1* | 8/2004 | Horita | H04N 1/40093 |
| | | | 348/234 |
| 2010/0075712 A1* | 3/2010 | Sethuraman | H04M 1/6041 |
| | | | 455/556.1 |
| 2010/0317332 A1* | 12/2010 | Bathiche | H04B 1/202 |
| | | | 455/418 |
| 2011/0037712 A1* | 2/2011 | Kim | H04M 1/7253 |
| | | | 345/173 |
| 2011/0053642 A1* | 3/2011 | Lee | H04W 4/029 |
| | | | 455/556.1 |
| 2012/0088526 A1* | 4/2012 | Lindner | H04M 1/72522 |
| | | | 455/457 |
| 2013/0235347 A1* | 9/2013 | Hennessey | G06F 3/013 |
| | | | 351/210 |
| 2014/0096084 A1 | 4/2014 | Kwon et al. | |
| 2015/0133051 A1* | 5/2015 | Jamal-Syed | H04M 1/7253 |
| | | | 455/41.2 |
| 2015/0347850 A1 | 12/2015 | Berelejis et al. | |
| 2016/0248964 A1* | 8/2016 | Okamoto | G03B 17/561 |
| 2016/0274762 A1 | 9/2016 | Lopez et al. | |
| 2017/0337743 A1* | 11/2017 | Metzler | G06K 9/00671 |
| 2017/0353922 A1* | 12/2017 | Shirakawa | H04W 68/005 |
| 2019/0182877 A1* | 6/2019 | Koike | H04W 76/27 |

\* cited by examiner

MOBILE DEVICE AND CONTROL METHOD

CROSS-REFERENCE TO RELATED APPLICATION

This application claims priority to U.S. Provisional Application Ser. No. 62/530,862, filed Jul. 11, 2017, which is herein incorporated by reference in its entirety.

BACKGROUND

Field of Invention

The present invention relates to a mobile device and a control method. More particularly, the present invention relates to a mobile device capable of recognizing and remotely controlling other wireless devices.

Description of Related Art

The augmented reality device merges virtual objects into the real world, and thereby can enrich the visual experience of the user. As the hardware and software of the augmented reality technology advance, people would wear the augmented reality devices for a considerable time in their daily lives.

However, it is inconvenient for the user wearing the augmented reality device to manipulate other electronic devices locating at rather far distances. For example, the activity range of the user may be limited by the length of the transmission line of the augmented reality device. Therefore, to manipulate other electronic devices, the user usually has to pause or terminate the activity utilizing the augmented reality device, and thereby lowering the user experience.

SUMMARY

The disclosure provides a control method suitable for a mobile device comprising a camera. The control method includes following operations: obtaining a description of a first wireless device adjacent to the mobile device over a first wireless communication; capturing a first image of a physical environment by the camera; recognizing a first candidate object within the first image; matching the first candidate object with the description of the first wireless device; and in response to that the first candidate object matches with the description of the first wireless device and a first predetermined instruction is received by the camera, generating a first command according to the description of the first wireless device, wherein the first command is to be transmitted to the first wireless device over a second wireless communication for manipulating the first wireless device.

This disclosure further provides a mobile device. The mobile device comprises a camera, a wireless communication circuit, and a processing circuit. The camera is configured to capture a first image of a physical environment. The wireless communication circuit is configured to obtain a description of a first wireless device adjacent to the mobile device over a first wireless communication. The processing circuit couples with the camera and the wireless communication circuit, and being adapted to recognize a first candidate object within the first image; match the first candidate object with the description of the first wireless device; and in response to that the first candidate object matches with the description of the first wireless device and a first predetermined instruction is received by the camera, generate a first command according to the description of the first wireless device, wherein the first command is to be transmitted to the first wireless device over a second wireless communication for manipulating the first wireless device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
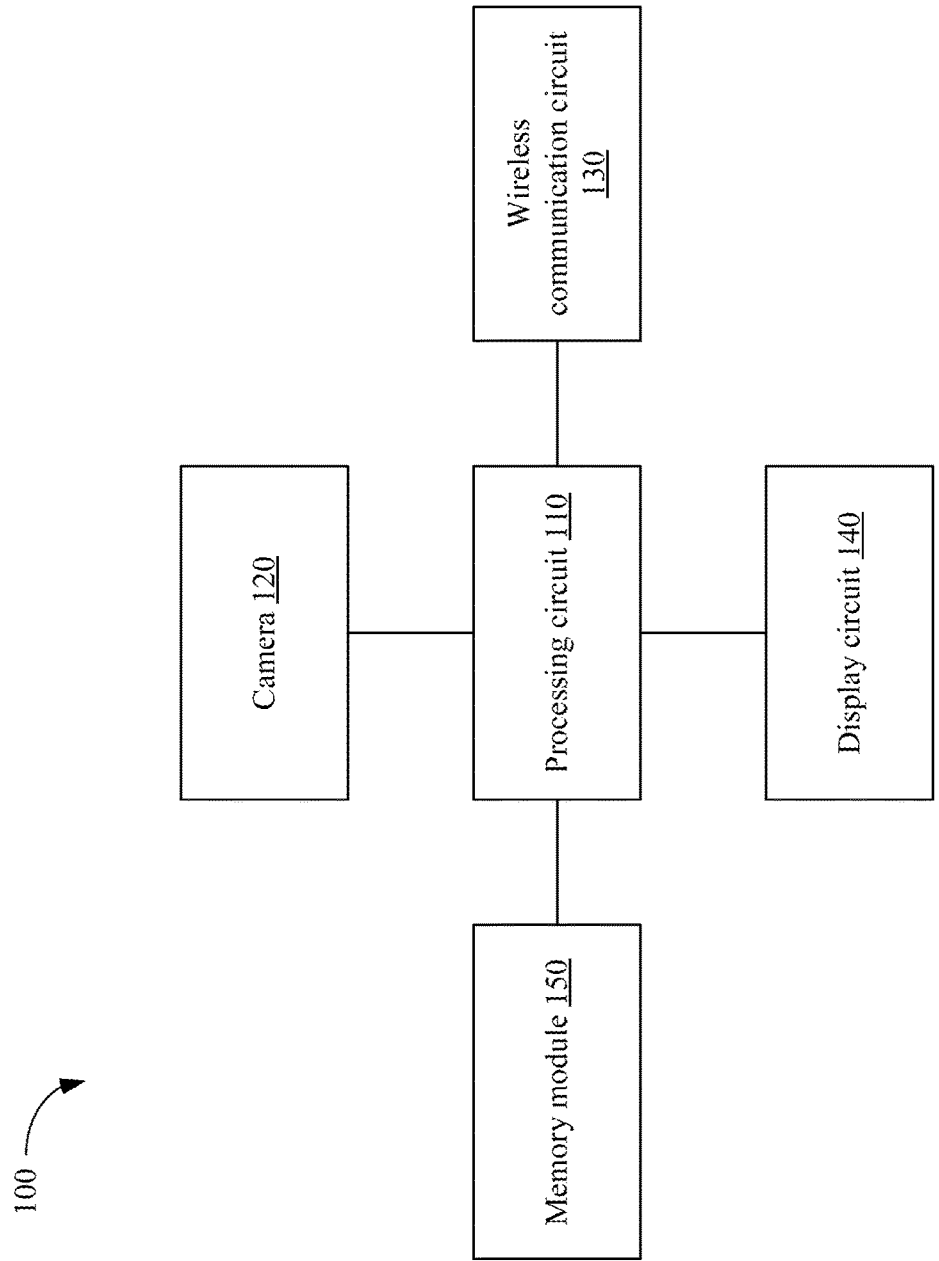
FIG. 1 is a simplified functional block diagram of a mobile device according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used herein, the term "and/or" includes any and all combinations of one or more of the associated listed items. In addition, the singular forms "a", "an", and "the" as used herein are intended to include the plural forms as well, unless the context clearly indicates otherwise.

FIG. 1 is a simplified functional block diagram of a mobile device 100 according to an embodiment of the present disclosure. The mobile device 100 comprises a processing circuit 110, a camera 120, a wireless communication circuit 130, a display circuit 140, and a memory module 150. The processing circuit 110 couples with the camera 120, the wireless communication circuit 130, the display circuit 140, and the memory module 150. In this embodiment, the mobile device 100 may be, but is not limited to, an augmented reality device or a mixed reality device.

The camera 120 is configured to capture images of a physical environment at which the mobile device 100 locates. The wireless communication circuit 130 is configured to obtain descriptions of the wireless devices 210a~210d. The display circuit 140 is configured to display the images captured by the camera 120. The memory module 150 is configured to store data required by the operations of the processing circuit 110.

In practice, the description of each wireless devices 210a~210d may include, but is not limited to, a Service Set Identifier (SSID), a Media Access Control Address (MAC address), a list of operable commands, and a model number. The model number may represent the manufacturer or category of each wireless devices 210a~210d.

Figure 2:
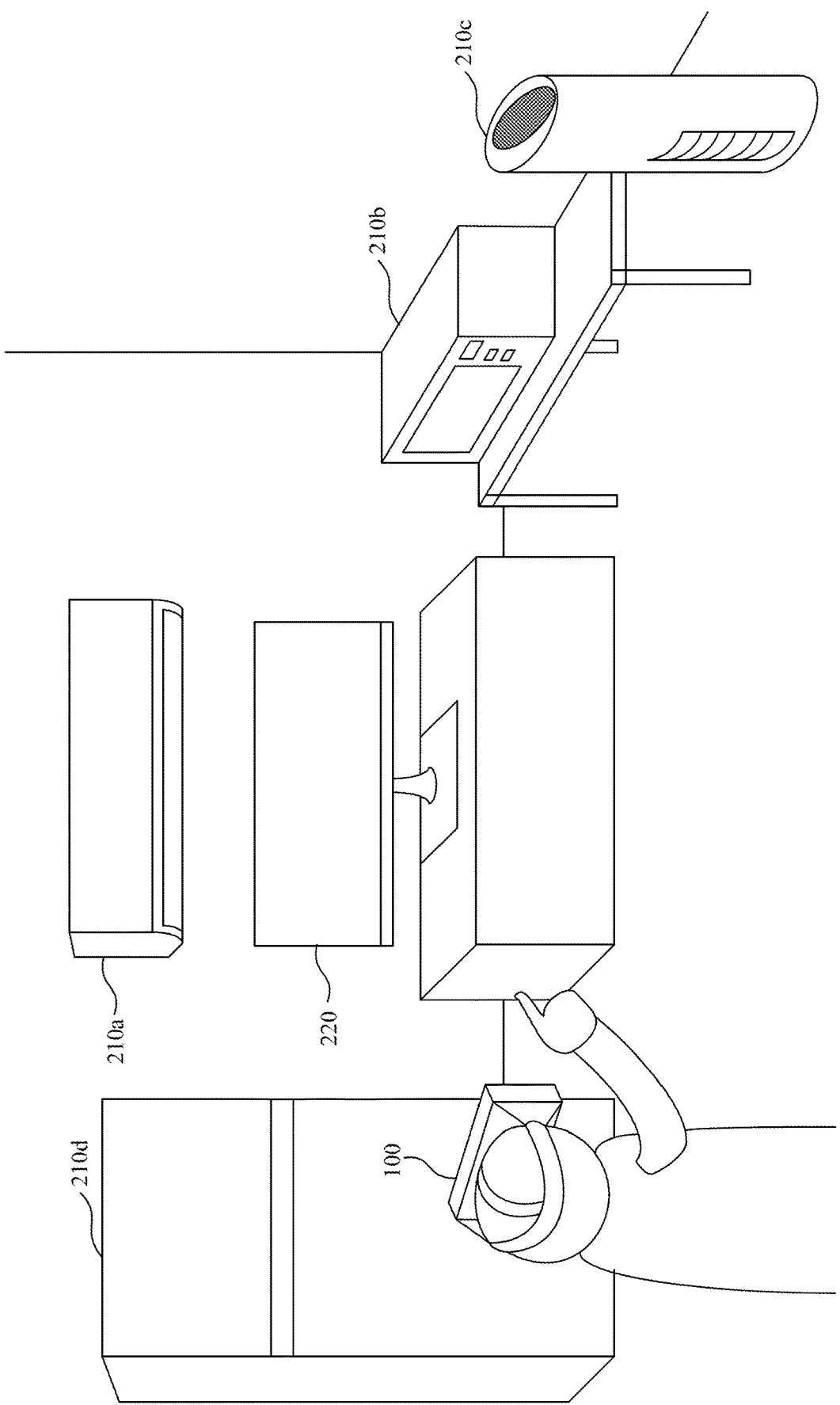
FIG. 2 is a simplified schematic diagram of a physical environment at which the mobile device locates according to an embodiment of the present disclosure.

FIG. 2 is a simplified schematic diagram of the aforesaid physical environment according to an embodiment of the present disclosure. In the physical environment, wireless devices 210a~210d and a normal device 220 locate nearby the mobile device 100. The wireless devices 210a~210d are capable of establishing wireless communications, while the normal device 220 has no wireless communication function.

In practice, the wireless devices 210a~210c may be realized with various smart household appliances having wireless communication function such as an air conditioner, a refrigerator, a microwave oven, or an air purifier. The processor circuit 110 may be realized with various integrated circuits having calculation capability such as the application-specific integrated circuit (ASIC) or the field-programmable gate array (FPGA). The memory module 150 may be realized with various read-only memory circuits or flash memory circuits. The display circuit 140 may be realized with various display panels such as active-matrix organic light-emitting display panel or liquid-crystal display panel. The wireless communication circuit 130 may be realized with various interface circuits meeting the related regulations of the wireless communication, such as the Wi-Fi interface circuit, the Bluetooth interface circuit, the Bluetooth Low Energy (BLE) interface circuit.

Figure 3:
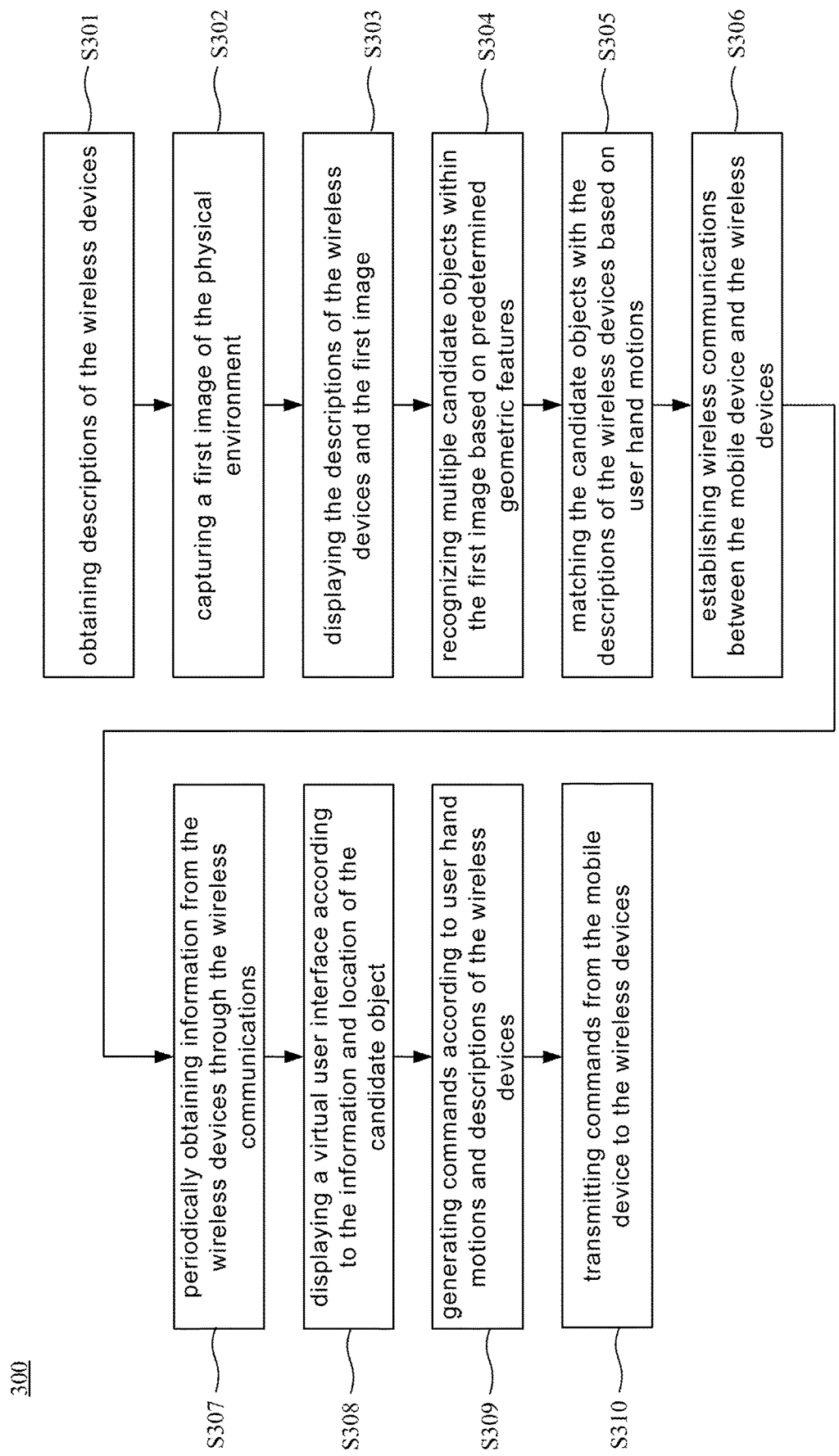
FIG. 3 is a simplified flowchart for illustrating a control method suitable for the mobile device of FIG. 1 according to an embodiment of the present disclosure.

FIG. 3 is a simplified flowchart for illustrating a control method 300 of allowing the mobile device 100 to remotely control the wireless devices 210a~210d according to an embodiment of the present disclosure. In operation S301, when the mobile device 100 approaches to the wireless devices 210a~210d, the processing circuit 110 may instruct the wireless communication circuit 130 to obtain descriptions of the wireless devices 210a~210d. For example, the mobile device 100 may wirelessly communicate with the wireless devices 210a~210d through various broadcast packets.

Then, in operation S302, the processing circuit 110 may instruct the camera 120 to capture a first image 400 of the physical environment.

Figure 4:
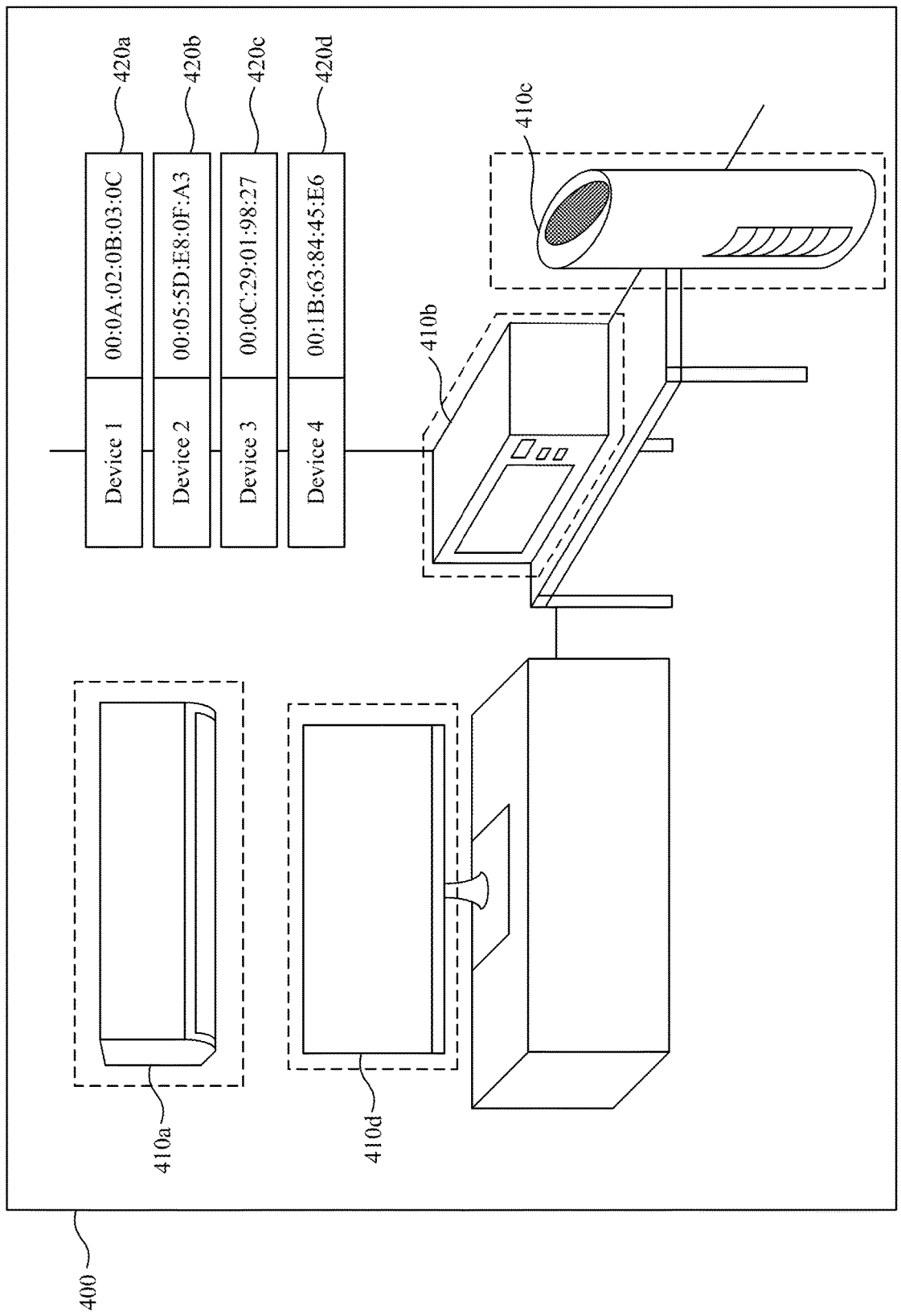
FIGS. 4~6 are simplified schematic diagrams of pictures displayed by the display module of FIG. 1 according to an embodiment of the present disclosure.

In operation S303, as shown in FIG. 4, the processing circuit 110 may instruct the display circuit 140 to display the first image 400 and the obtain descriptions of the wireless devices 210a~210d. The processor 110 may then conduct operation S304 to recognize multiple candidate objects 410a~410d within the first image 400 based on predetermined geometric features stored in the memory module 150.

Notably, the descriptions of the wireless devices 210a~210d may be included in message boxes 420a~420d, respectively. The message boxes 420a~420d overlap with the first image 400, so as to cover a portion of the first image 400. The multiple candidate objects are each corresponding to one of the wireless devices 210a~210d or the normal device 220. In detail, the multiple candidate objects 410a~410d are corresponding to the wireless devices 210a~210c and the normal device 220, respectively.

In operation 304, as shown in FIG. 4, the processing circuit 110 may also instruct the display circuit 140 to emphasize the outline of each of the candidate objects 410a~410d, so as to prompt a user at which the candidate objects 410a~410d locate. In this embodiment, the processing circuit 110 may utilize solid lines or dotted lines to emphasize the outlines of the candidate objects 410a~410d.

In practice, the predetermined geometric features may be, but are not limited to, the geometric features of various household appliances such as the air conditioner and the microwave oven.

In operation S305, the mobile device 100 may match the descriptions of the wireless devices 210a~210d with the candidate objects 410a~410d according to received instructions. For example, the mobile device 100 may prompt the user, by a message shown by the display circuit 140 or broadcasted by an speaker (not shown in FIG. 1), to match the descriptions of the wireless devices 210a~210d with at least one of the candidate objects 410a~410d by hand motions. The mobile device 100 may then capture the user's hand motions by the camera 120, and translate the user's hand motions to instructions for the matching operations.

Figure 5:
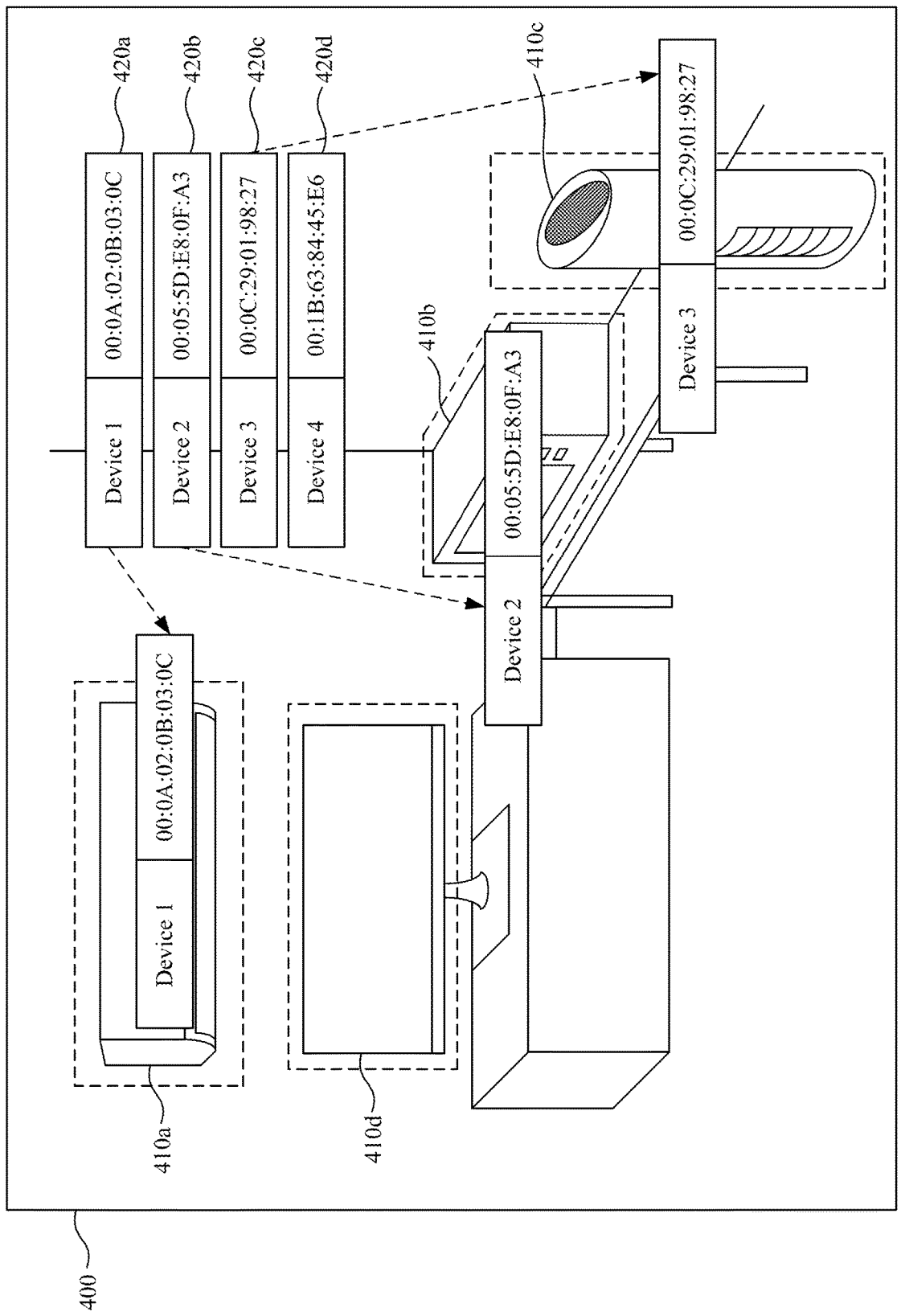

To be more specific, as shown in FIG. 5, the user may drag the message boxes 420a~420c to overlap with the candidate objects 410a~410c by hand motions, respectively, and does not drag the message box 420d to overlap with the candidate object 410d. As a result, the processing circuit 110 may match the description of the wireless devices 210a with the candidate object 410a, match the description of the wireless devices 210b with the candidate object 410b, match the description of the wireless devices 210c with the candidate object 410c, and so on. Notably, since no description is dragged to be overlapped with the candidate object 410d, the processing circuit 110 would not match the candidate object 410d with any description.

By matching the descriptions of the wireless devices 210a~210c with the candidate objects 410a~410c, respectively, the mobile device 100 knows the SSID, the MAC address, and/or the model number corresponding to each candidate objects 410a~410c. That is, the mobile device 100 knows the identities of each of the candidate objects 410a~410c.

In operation S306, in response to that the candidate objects 410a~410c match with the descriptions of the wireless devices 210a~210c, the processing circuit 110 instructs the wireless communication circuit 130 to establish wireless communications between the wireless communication circuit 130 and each of the wireless devices 210a~210c. The wireless communications between the wireless communication circuit 130 and each of the wireless devices 210a~210c are established according to the descriptions of the wireless devices 210a~210c, respectively.

Notably, since the description of the wireless device 210d does not match with any candidate object, the mobile device 100 would not use the description of the wireless device 210d to establish any wireless communication.

Then, the mobile device may conduct operation S307 to periodically obtain information from the wireless devices 210a~210c over wireless communications.

Figure 6:
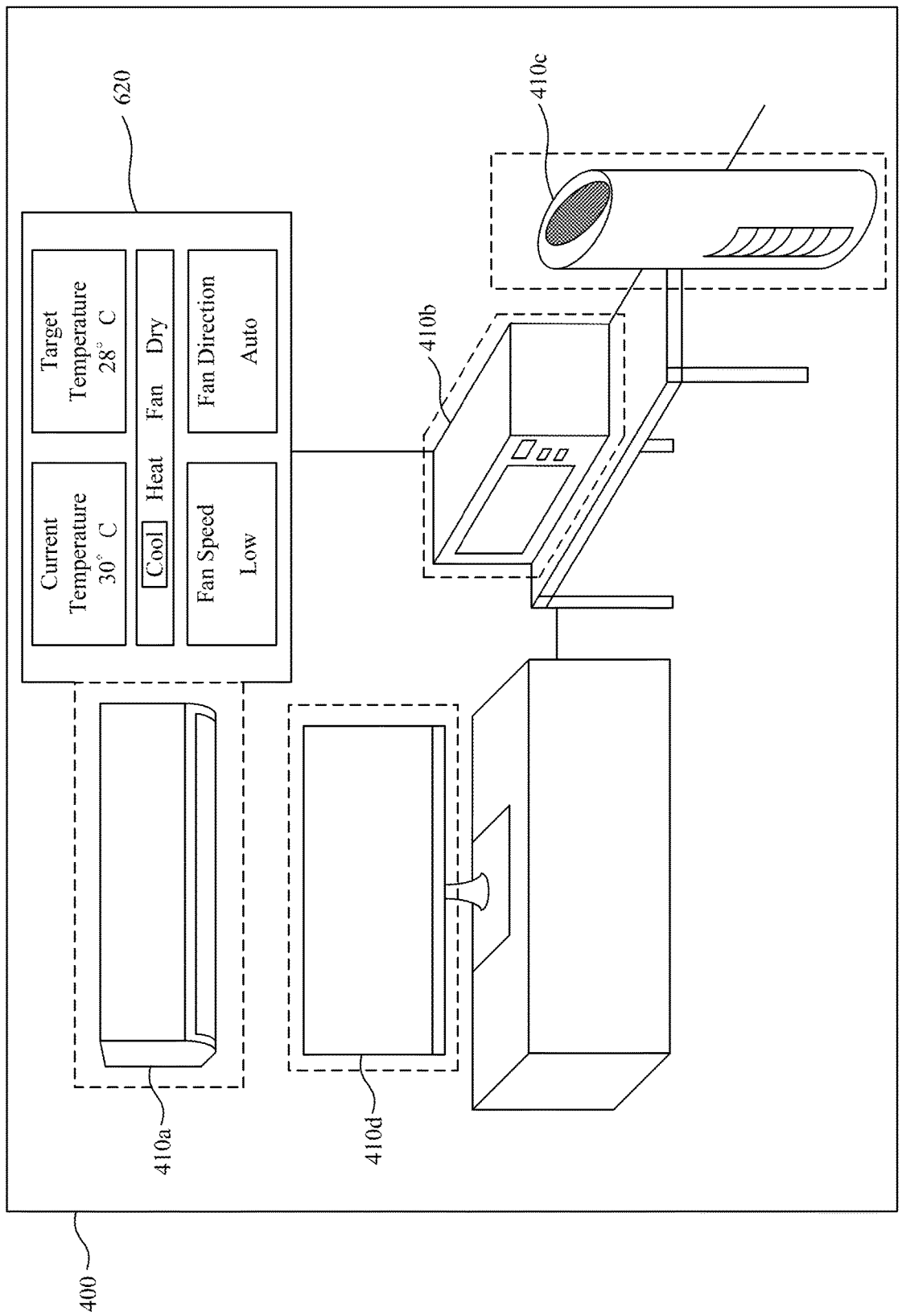

In this embodiment, the mobile device 100 may detect eye movement of the user. In operation S308, as shown in FIG. 6, when the user stares at one of the candidate objects 410a~410c had been matched with the descriptions of the wireless devices 210a~210c, the processing circuit 110 may instruct the display circuit 140 to show a virtual user interface 620 according to the location of the one of the candidate objects 410a~410c being stared.

For example, when the user stares at the candidate object 410a, the processing circuit 110 may instruct the display circuit 140 to show a virtual user interface 620 nearby the candidate object 410a. The virtual user interface 620 may contain information periodically obtained from the wireless device 210a.

In some embodiments, at least a portion of an outline of the user interface 620 connects with at least a portion of the outline of the candidate object 410a.

In other embodiments, the processing circuit 110 instructs the display circuit 140 to show the virtual user interface 620 only if one of the candidate objects 410a~410c overlaps with a region locating at the center of the picture displayed by the display circuit 140.

In operation S309, when the user interacts with the candidate object 410a through the virtual user interface 620 by predetermined instructions (e.g., predetermined hand motions), the camera 120 would receive the hand motions. Then, the processing circuit 110 may interpret the hand motions, and generate corresponding commands according to the interpreted hand motions and the list of operable commands included in the description of the wireless device 210a.

In operation S310, when the processing circuit 110 receives further instructions (e.g., other hand motions) from the user, the processing circuit 110 may instruct the wireless communication circuit 130 to transmit the corresponding commands to the wireless device 210a over the wireless communication between the mobile device 100 and the wireless device 210a, so as to manipulate the wireless device 210a.

In some embodiments, the user may interact with the candidate objects 410a~410c by voice commands based on the information shown on the virtual user interface 620. The processing circuit 110 would interpret the voice commands to generate the corresponding commands, and instruct the wireless communication circuit 140 to transfer the corresponding commands to the wireless devices 210a.

In another embodiment, after the first image is captured, the processing circuit 110 may further instruct the camera 120 to capture a series of images of the physical environment. The processing circuit 110 may recognizing the candidate objects 410a— 410c in the series of images, and perform operations similar to operations S303~S309. Furthermore, when the processing circuit 110 determines that one of the candidate object 410a~410c has been absent from the series of images for a predetermined time period, the processing circuit 110 may instruct the wireless communication circuit 130 to disconnect the wireless communication between the mobile device 100 and the wireless device corresponding to the absent candidate object. As a result, the power consumption of the wireless device corresponding to the absent candidate object may be reduced.

In yet another embodiment, size of the virtual user interface 620 is positively correlated with size of the candidate object 410a.

The control method 300 illustrated by FIG. 3 may lead to pairing errors. For example, the user may incorrectly match the message box 420a with the candidate objects 410d corresponding to the normal device 220 having no wireless communication functions. As a result, when the user interacts with the candidate objects 410d through the virtual user interface, the device actually controlled by the user would be the wireless device 210a.

Figure 7A:
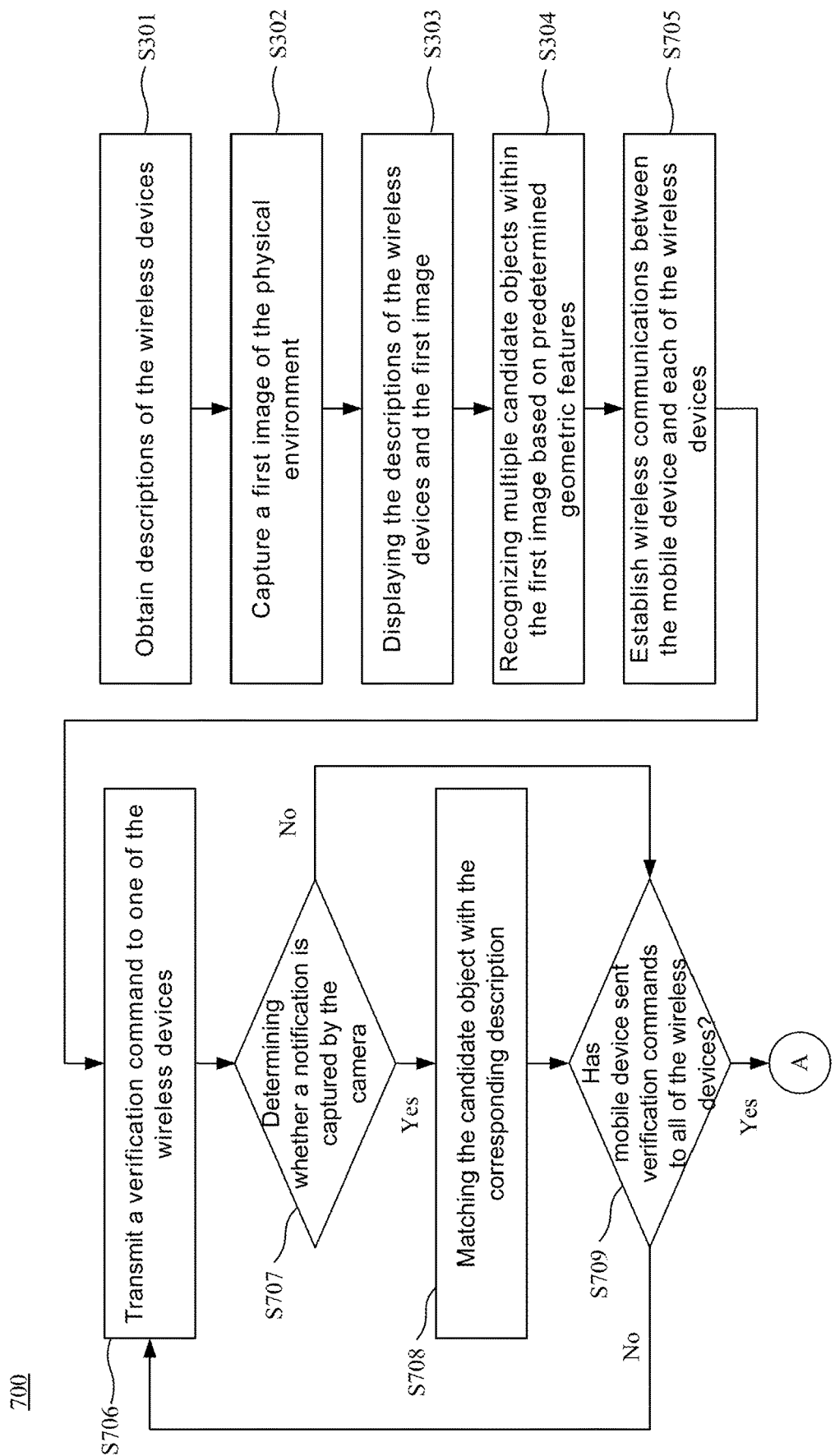
FIGS. 7A~7B collaboratively show a simplified flowchart for illustrating another control method suitable for the mobile device of FIG. 1 according to an embodiment of the present disclosure.
Figure 7B:
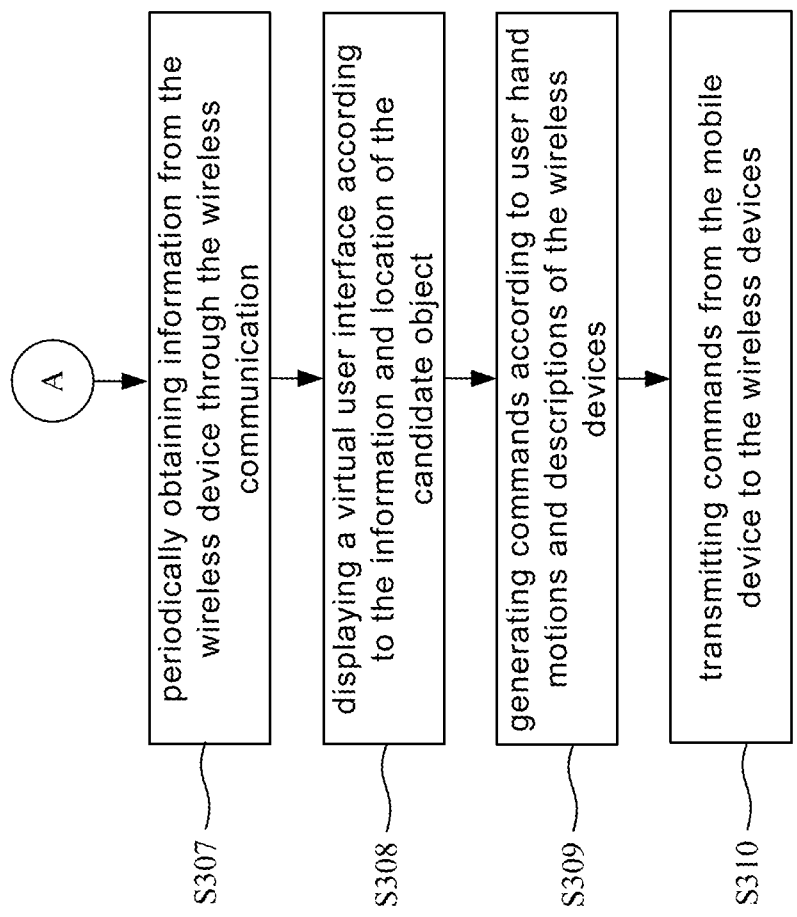

FIGS. 7A and 7B collaboratively illustrate another control method 700 of allowing the mobile device 100 to remotely control the wireless devices 210a~210d according to another embodiment of the present disclosure. In this embodiment, the mobile device 100 may automatically match the descriptions of the wireless devices 210a~210d with the candidate objects 410a~410d, so as to prevent the aforementioned pairing errors.

Operations S301~S304 of the control method 700 are similar to the operations S301~S304 of the control method 300, for the sake of brevity, those operations are not addressed herein. Please refer to FIG. 7A, in operation S705, the processing circuit 110 may instruct the wireless communication circuit 130 to establish wireless communications between the mobile device 100 and each of the wireless devices 210a~210d according to the descriptions of the wireless devices 210a~210d.

Figure 8:
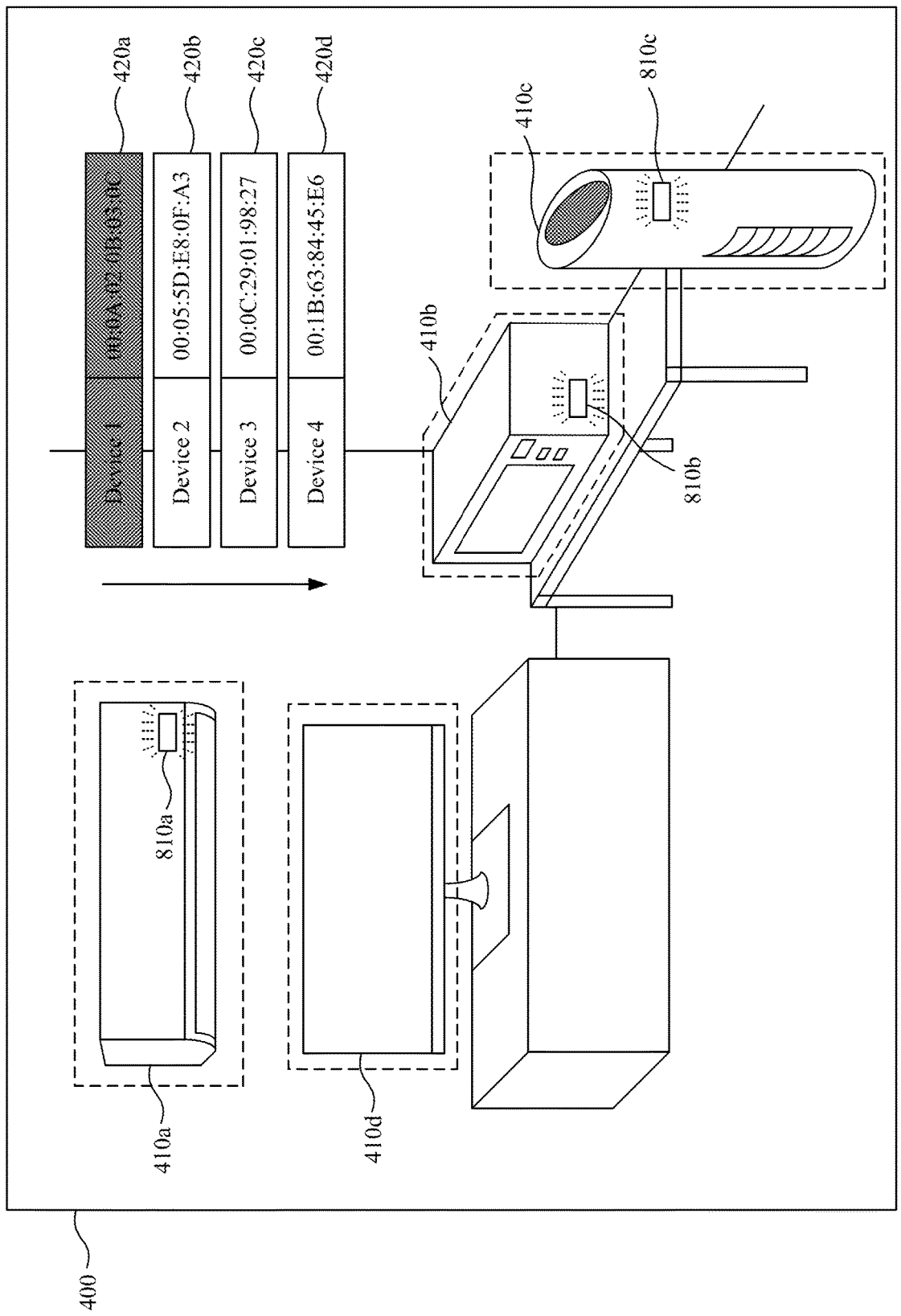
FIG. 8 is a simplified schematic diagram of a picture displayed by the display module of FIG. 1 according to an embodiment of the present disclosure.

In operation S706, as shown in FIG. 8, the processing circuit 110 may instruct the display circuit 140 to emphasize the message box 420a, and instruct the wireless communication circuit 130 to transfer a first verification command to the wireless device 210a according to the description of the wireless device 210a. As a result, the wireless device 210a would be triggered to generate a first notification 810a.

In operation S707, the processing circuit 110 may determine whether the first notification 810a is captured by the camera 120. If the first notification 810a is captured by the camera 120 within a region surrounded by the outline of the candidate object 410a, the mobile device may conduct operation S708 to match the description of the wireless device 210a with the candidate object 410a.

In the situation that the first notification 810a has not been captured by the camera 120 for a predetermined time period or the operation S708 is finished, the processing circuit 110 may conduct operation S709 to determine whether the mobile device 100 has sent varication commands to all of the wireless devices 210a~210d. If the mobile device 100 has not yet sent the varication commands to all of the wireless devices 210a~210d, the processing circuit 110 may again conduct the operation S706.

For example, when the processing circuit 110 conducts the operation S706 for a second time, the processing circuit 110 may instruct the display circuit 140 to emphasize the message box 420b. The processing circuit 110 may also instruct the wireless communication circuit 130 to transfer a second verification command to the wireless device 210b according to the description of the wireless device 210b. As a result, the wireless device 210b would be triggered to generate a second notification 810b.

As shown in FIG. 8, if the second notification 810b is captured by the camera 120 within a region surrounded by the outline of the candidate object 410b, the processing circuit 110 matches the description of the wireless devices 210b with the candidate object 410b. Similarly, when the processing circuit 110 conducts the operation S706 for a third time, if the third notification 810c is captured by the camera 120 within a region surrounded by the outline of the candidate object 410c, the processing circuit 110 matches the description of the wireless devices 210c with the candidate object 410c, and so on.

That is, the mobile device 100 sequentially transmits the verification commands to the wireless devices 210a~210d according to the descriptions of the wireless devices 210a~210d, so as to trigger the wireless devices 210a~210d to sequentially generate the notifications.

If the mobile device 100 has sent the varication commands to all of the wireless devices 210a~210d, the processing circuit 110 may conduct operations similar to the aforesaid operations S307~S310, for the sake of brevity, those operations are not addressed herein.

It is worth mentioning that since the wireless device 210d is not captured by the camera 120, a fourth notification generated by the wireless device 210d is not captured by the camera 120 either. Therefore, the processing circuit 110 would not match the description of the wireless device 210d with any candidate object, and thereby the mobile device 100 would not transmit any command to manipulate the wireless device 210d according to the description of the wireless device 210d.

Accordingly, the control method 700 prevents the pairing errors by sequentially transmitting verification commands to all of the wireless devices nearby, and sequentially analyzing the locations of the notifications. Moreover, by sequentially emphasizing the message boxes 420a~420d, the mobile device 100 may prompt the user the relationships between the descriptions of the wireless device 210a~210d and the candidate objects 410a~410d, so as to prevent the erroneously manipulation conducted by the user.

As can be seen from the foregoing descriptions, the mobile device 100 and the control methods 300 and 700 collaboratively allow the user to remotely and intuitively control various wireless devices.

Please note that the execution orders of the operations illustrated by FIGS. 3 and 7A~7B are merely exemplary embodiments, rather than restrictions to the practical implementations. For example, in an embodiment, the operations S301~S302 can be conducted simultaneously, the operations S307~S310 can also be conducted simultaneously.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for a mobile device comprising a camera, the control method comprising:
   obtaining a description of a first wireless device adjacent to the mobile device through a plurality of broadcast packets;
   capturing a first image of a physical environment by the camera;
   recognizing a first candidate object within the first image;
   matching the first candidate object with the description of the first wireless device;
   in response to that the first candidate object matches with the description of the first wireless device and a first predetermined instruction is received by the camera, generating a first command according to the description of the first wireless device, wherein the first command is to be transmitted to the first wireless device over a second wireless connection for manipulating the first wireless device;
   in response to that the first candidate object matches with the description of the first wireless device, capturing a series of images of the physical environment by the camera, wherein the series of images comprises a second image and a third image captured after the second image for a predetermined time period;
   recognizing the first candidate object within the second image; and
   in response to that the first candidate object is absent within the third image, disconnecting the second wireless connection.

2. The control method of claim 1, wherein the first predetermined instruction comprises user hand motions.

3. The control method of claim 1, wherein the operation of matching the first candidate object with the description of the first wireless device further comprises:
   displaying the first candidate object;
   emphasizing an outline of the first candidate object;
   displaying the description of the wireless device;
   matching or pairing the first candidate object with the description of the first wireless device based on user hand motions; and
   in response to that the first candidate object matches with the description of the first wireless device, establishing the second wireless connection between the first wireless device and the mobile device according to the description of the first wireless device.

4. The control method of claim 3, further comprising:
   periodically obtaining information from the first wireless device over the second wireless connection; and
   displaying a virtual user interface according to the location of the first candidate object, wherein the virtual user interface is generated according to the obtained information.

5. The control method of claim 4, wherein the mobile device displays the virtual user interface only if the first candidate object overlaps with a region locating at the center of the first image, or only if the first candidate object is stared by a user.

6. The control method of claim 4, wherein at least a portion of an outline of the virtual user interface connects with at least a portion of the outline of the first candidate object.

7. The control method of claim 1, further comprising:
   obtaining a description of a second wireless device adjacent to the mobile device over a third wireless connection;
   recognizing a second candidate object within the first image;
   matching the first candidate object and the second candidate object with the description of the first wireless device and the description of the second wireless device, respectively; and
   in response to that the second candidate object matches with the description of the second wireless device and a second predetermined instruction is received by the camera, generating a second command according to the description of the second wireless device, wherein the second command is to be transmitted to the second wireless device over a fourth wireless connection for manipulating the second wireless device.

8. The control method of claim 7, wherein the operation of matching the first candidate object and the second candidate object with the description of the first wireless device and the description of the second wireless device, respectively, further comprises:
    establishing the second wireless connection between the first wireless device and the mobile device according to the description of the first wireless device;
    establishing the fourth wireless connection between the second wireless device and the mobile device according to the description of the second wireless device;
    transmitting a first verification command to the first wireless device over the second wireless connection, so as to trigger the first wireless device to generate a first notification;
    determining whether the first notification is detected by the camera or not;
    transmitting a second verification command to the second wireless device over the fourth wireless connection, so as to trigger the second wireless device to generate a second notification;
    determining whether the second notification is detected by the camera or not;
    in response to that the first notification is detected by the camera, determining the first candidate object is matched with the description of the first wireless device; and
    in response to that the second notification is detected by the camera, determining the second candidate object is matched with the description of the second wireless device.

9. The control method of claim 8, wherein the mobile device transmits the first verification command and the second verification command sequentially.

10. The control method of claim 8, wherein the mobile device matches or pairs the first candidate object with the first wireless device only if the first notification locates within a region surrounded by an outline of the first candidate object, and matching or pairing the second candidate object with the second wireless device only if the second notification locates within a region surrounded by an outline of the second candidate object.

11. The control method of claim 1, wherein the description of the first wireless device comprises media access control (MAC) address and a list of operable commands,
    wherein the mobile device establishes the second wireless connection according to the MAC address of the first wireless device, and sends the first command according to the list of operable commands of the first wireless device.

12. A mobile device comprising:
    a camera, configured to capture a first image of a physical environment;
    a wireless communication circuit, configured to obtain a description of a first wireless device adjacent to the mobile device through a plurality of broadcast packets;
    a processing circuit, coupled with the camera and the wireless communication circuit, and being adapted to:
        recognize a first candidate object within the first image;
        match the first candidate object with the description of the first wireless device; and
        in response to that the first candidate object matches with the description of the first wireless device and a first predetermined instruction is received by the camera, generate a first command according to the description of the first wireless device, wherein the first command is to be transmitted to the first wireless device over a second wireless connection for manipulating the first wireless device,
    wherein in response to that the first candidate object matches with the description of the first wireless device, the processing circuit instructs the camera to capture a series of images of the physical environment, the series of images comprises a second image and a third image captured after the second image for a predetermined time period, and the processing circuit recognizes the first candidate object within the second image,
    wherein in response to that the first candidate object is absent within the third image, the processing circuit instructs the wireless communication circuit to disconnect the second wireless connection.

13. The mobile device of claim 12, wherein the first predetermined instruction comprises user hand motions.

14. The mobile device of claim 12, further comprising:
    a display circuit, coupled with the processing circuit;
    wherein the processing circuit is further adapted to:
        instruct the display circuit to display the first image comprising the first candidate object;
        instruct the display circuit to emphasize an outline of the first candidate object;
        instruct the display circuit to display the description of the first wireless device;
        match or pair the candidate object with the description of the first wireless device based on user hand motions; and
        in response to that the first candidate object matches with the description of the first wireless device, establish the second wireless connection between the first wireless device and the wireless communication circuit according to the description of the first wireless device.

15. The mobile device of claim 14, wherein the processing circuit instructs the wireless communication circuit to periodically obtain information from the first wireless device over the second wireless connection, and instructs the display circuit to display a virtual user interface according to the location of the first candidate object,
    wherein the virtual user interface is generated according to the obtained information.

16. The mobile device of claim 15, wherein the display circuit displays the virtual user interface only if the first candidate object overlaps with a region locating at the center of the first image, or only if the first candidate object is stared by a user.

17. The mobile device of claim 15, wherein at least a portion of an outline of the user interface overlaps with at least a portion of the outline of the first candidate object.

18. The mobile device of claim 12, wherein the wireless communication circuit are further configured to obtain a description of a second wireless device adjacent to the mobile device over a third wireless connection, and
    wherein the processing circuit are further adapted to:
        recognize a second candidate object within the first image;
        match the first candidate object and the second candidate object with the description of the first wireless device and the description of the second wireless device, respectively; and
        in response to that the second candidate object matches with the description of the second wireless device and a second predetermined instruction is received by the camera, generate a second command according to the description of the second wireless device, wherein the second command is to be transmitted to the second wireless device over a fourth wireless connection for manipulating the second wireless device.

19. The mobile device of claim 18, wherein when the processing circuit matches the first candidate object and the second candidate object with the description of the first wireless device and the description of the second wireless device, respectively, the processing circuit is further adapted to:

establish the second wireless connection between the first wireless device and the wireless communication circuit according to the description of the first wireless device;

establish the fourth wireless connection between the second wireless device and the wireless communication circuit according to the description of the second wireless device;

instruct the wireless communication circuit to transmit a first verification command to the first wireless device over the second wireless connection, so as to trigger the first wireless device to generate a first notification;

determine whether the first notification is detected by the camera or not;

instruct the wireless communication circuit to transmit a second verification command to the second wireless device over the fourth wireless connection, so as to trigger the second wireless device to generate a second notification;

determine whether the second notification is detected by the camera or not;

in response to that the first notification is detected by the camera, determine the first candidate object is matched with the description of the first wireless device; and in response to that the second notification is detected by the camera, determine the second candidate object is matched with the description of the second wireless device.

20. The mobile device of claim 19, wherein the processing circuit instructs the wireless communication circuit to transmit the first verification command and the second verification command sequentially.

21. The mobile device of claim 19, wherein the processing circuit matches or pairs the first candidate object with the first wireless device only if the first notification locates within a region surrounded by an outline of the first candidate object, and matching or pairing the second candidate object with the second wireless device only if the second notification locates within a region surrounded by an outline of the second candidate object.

22. The mobile device of claim 12, wherein the description of the first wireless device comprises MAC address and a list of operable commands, wherein the processing circuit establishes the second wireless connection according to the MAC address of the first wireless device, and sends the first command according to the list of operable commands of the first wireless device.

* * * * *